(12) United States Patent
Davis (10) Patent No.: US 12,179,946 B2
(45) Date of Patent: Dec. 31, 2024

(54) ORAL CARE SYSTEM WITH ELECTRIC DRONE

(71) Applicant: Richard D. Davis, Mitzpe Ramon (IL)

(72) Inventor: Richard D. Davis, Mitzpe Ramon (IL)

( * ) Notice: Subject to any disclaimer, the term of this patent is extended or adjusted under 35 U.S.C. 154(b) by 0 days.

(21) Appl. No.: 18/210,159

(22) Filed: Jun. 15, 2023

(65) Prior Publication Data
US 2024/0190592 A1 Jun. 13, 2024

Related U.S. Application Data

(60) Provisional application No. 63/431,376, filed on Dec. 9, 2022.

(51) Int. Cl.
| | |
|---|---|
| *B64U 10/13* | (2023.01) |
| *A61C 17/22* | (2006.01) |
| *B64U 20/87* | (2023.01) |
| *B64U 50/30* | (2023.01) |
| *B64U 101/30* | (2023.01) |

(52) U.S. Cl.
CPC ............ *B64U 20/87* (2023.01); *A61C 17/221* (2013.01); *A61C 17/222* (2013.01); *B64U 10/13* (2023.01); *B64U 50/30* (2023.01); *A61C 2204/002* (2013.01); *B64U 2101/30* (2023.01)

(58) Field of Classification Search
CPC ............... A61C 17/221; A61C 17/222; A61C 2204/002; B64U 10/13; B64U 20/87; B64U 50/30; B64U 50/34; B64U 50/37; B64U 80/25; B64U 2101/30

USPC ......................................................... 244/1 R
See application file for complete search history.

(56) References Cited

U.S. PATENT DOCUMENTS

| | | | | |
|---|---|---|---|---|
| 2017/0057636 | A1* | 3/2017 | Azaiz ...................... | B64U 30/20 |
| 2017/0129602 | A1* | 5/2017 | Alduaiji ............. | G06Q 30/0251 |
| 2019/0055015 | A1* | 2/2019 | Allard .................... | B64U 80/86 |
| 2020/0216173 | A1* | 7/2020 | Suefuku ................ | B64U 50/19 |

FOREIGN PATENT DOCUMENTS

| | | | | | |
|---|---|---|---|---|---|
| CN | 210541384 | U | * | 5/2020 | |
| CN | 111232201 | A | * | 6/2020 | |
| JP | 2016209801 | A | * | 12/2016 | |
| KR | 2018009803 | A | * | 1/2018 | ............ B08B 1/002 |
| KR | 2023000518 | A | * | 1/2023 | |

* cited by examiner

*Primary Examiner* — Joshua E Rodden
(74) *Attorney, Agent, or Firm* — Mark David Torche; Patwrite Law (57) ABSTRACT

Systems and methods for effective brushing and performing activities on a communication device without limiting the person's movement are disclosed. As aspect of the system comprises an electric drone system which provides a platform for placing an electric toothbrush and a communication device. The drone system and the electric toothbrush are connected via a communication network and the drone is operated via the electric toothbrush. The electric toothbrush and the mobile device are also connected via a communication network. The bushing and gaming activities are displayed and operated on the communication device placed on the drone system which moves along the person performing brushing activity with the electric toothbrush.

30 Claims, 8 Drawing Sheets

ORAL CARE SYSTEM WITH ELECTRIC DRONE

FIELD OF THE INVENTION

The disclosure herein relates to an oral care system. In particular, the embodiments of present invention relate to techniques, methods, systems and mechanisms for performing wireless communication between an electric toothbrush and a mobile computing device.

BACKGROUND OF THE INVENTION

With the introduction of electric toothbrushes in the market, the concept of oral care system has changed drastically. The electric toothbrushes have been effective in removing bacterial plaque and reducing mouth diseases such as gingivitis, periodontitis and bleeding gums.

In recent years, the oral care system has not been limited to electric toothbrush and charger. In addition to providing oral hygiene, the oral care system has proliferated its application to providing entertainment and engaging activities for motivating people, especially children, to brush regularly and in a proper way. This proliferation is directly tied to consumer adoption of smart phones and tablets. Companies are now creating their own unique apps that relate to and in some cases interact with oral care products.

A large number of gaming and activity apps are available to engage, motivate and teach people to develop oral care habits. The smartphones and tablets having oral care apps installed gets connected to the electric toothbrush via Bluetooth and engage people while brushing. In a few apps, the characters are controlled by the movement of the electric toothbrush making the activity of brushing more engaging and fun-filled.

However, in such cases, the smartphone or tablet need a countertop surface or platform, like a docking station, for placement while a person brushes and play games on the smartphone. Further, the position of the platform mostly remains fixed limiting the brushing activity to a particular place like bathroom. In case of non-fixed platforms, the person needs to carry the platform holding the smartphone to a different place in case he/she needs to move. This affects the brushing and playing experience of the person and also poses the risk of dropping and damaging the smartphone while carrying to the other place.

Thus, there is a need for an improved oral care system which provides uninterrupted brushing and playing experience to the person while moving. The invention described herein addresses the above-described needs.

SUMMARY OF THE EMBODIMENTS

In one aspect of the invention, a system for maintaining oral hygiene and performing activities on a communication device without limiting the person's movement is disclosed. The system includes an electric toothbrush, a communication device and an Aerial Vehicle (AV) Drone.

In another aspect of the invention, the electric toothbrush comprises a motorized brush head containing bristles and an elongated member having a proximal end configured to couple to the brush head and a distal end configured to engage with a platform, wherein the elongated member comprises a plurality of buttons. The electric toothbrush also comprises a camera configured to capture image of a person performing brushing activity, wherein the camera is configured to switch between an enabled state and a disabled state, and a network interface configured to enable communication between the electric toothbrush and one or more communication devices.

In a further aspect of the invention, the AV Drone also comprises a platform comprising a plurality of cavities for placing the electric toothbrush and one or more communication devices and a radio module configured to communicate with the electric toothbrush and the communication devices which are configured to operate the Drone.

In another aspect of the invention, the AV Drone is configured to move, either automatically or operable through the electric toothbrush buttons, along with the person performing the brushing activity using the electric toothbrush, and the Drone carrying the communication device enables the person to perform the brushing activity using the electric toothbrush and use installed applications on the communication device.

In yet another aspect of the invention, Drone further comprises a charging interface configured to connect with a charging stand for charging the batteries of the Drone.

In a further aspect of the invention, the AV Drone further comprises an interface for connecting with a Retractable Electric Tether through a connecting cable, wherein the retractable electric tether and the cable limit the movement of the Drone within a specific region.

In a further aspect of the invention, the AV Drone is configured to connect with an electronic wristband to be worn by the person performing brushing activity, the electronic wristband is operable to summon the Drone and bring it closer to the person performing brushing activity.

In a further aspect of the invention, a method for effective brushing and performing activities on a communication device without limiting the person's movement is disclosed. The method comprises providing an electric toothbrush, a communication device and an Aerial Vehicle (AV) Drone and placing the toothbrush and the communication device on the Drone pedestal. The method also comprises connecting the toothbrush and the Drone via a communication network.

In yet another aspect of the invention, the method comprises removing the toothbrush from the Drone pedestal and switching on the toothbrush. The method further comprises, operating a button on the toothbrush to switch on the Drone, lifting it to a required height and placing it in hover mode.

In yet another aspect of the invention, the method comprises connecting the toothbrush to the communication device via a network and starting brushing/gaming process. The person moving around while brushing with the electric toothbrush and playing games on the communication device carried by the Drone.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DESCRIPTION OF THE SELECTED EMBODIMENTS

Aspects of the present disclosure relates to techniques, methods, systems and mechanisms for performing wireless communication between an electric toothbrush and a mobile computing device. In particular, the disclosure relates to an electric drone system which provides a platform for keeping the mobile computing device. The drone system and the electric toothbrush are connected via a network, e.g. Bluetooth, and the drone is operated via the electric toothbrush. The electric toothbrush and the mobile device are also connected via a network, e.g. Bluetooth. The bushing and gaming activities are displayed and operated on the mobile device placed on the drone which moves along the person performing brushing activity with the electric toothbrush.

As required, the detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

Figure 1:
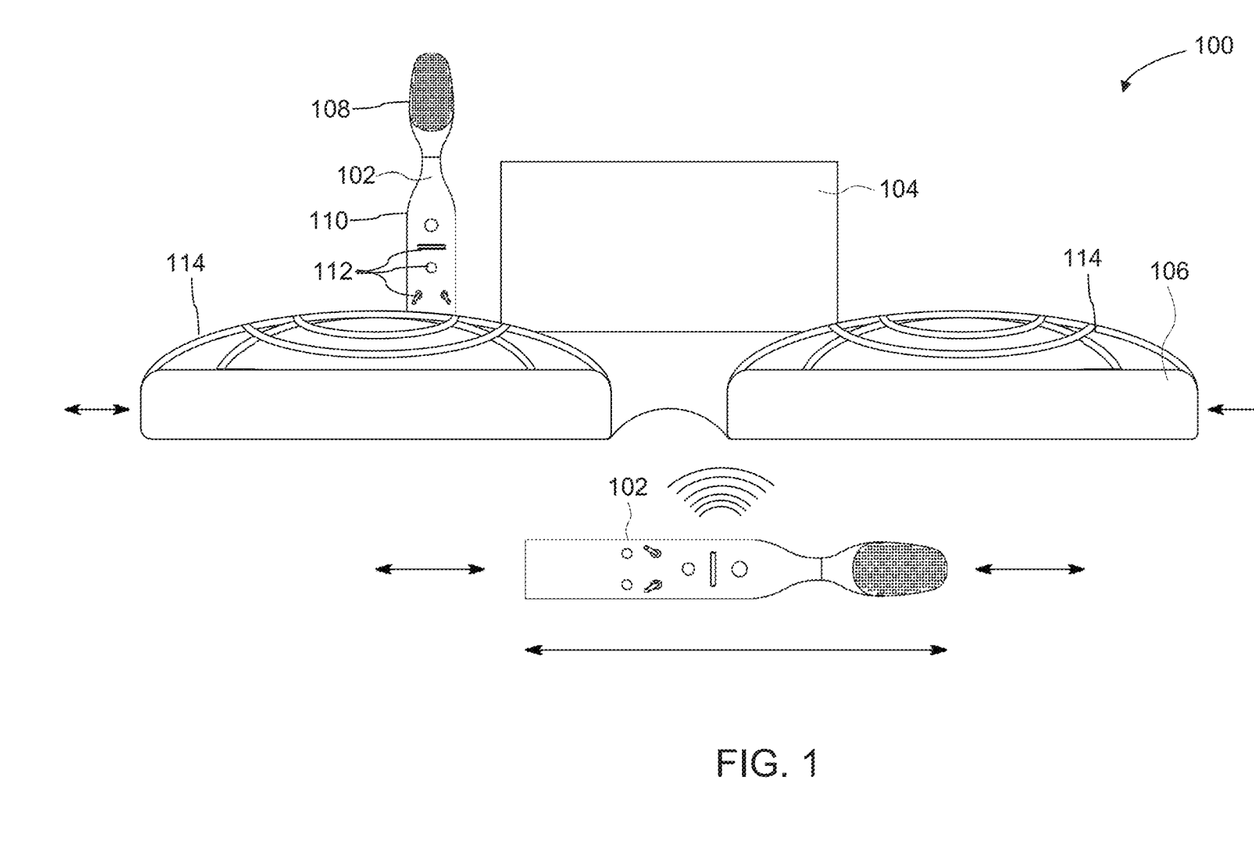
FIG. 1 illustrates a schematic representation of an oral care system 100 for brushing and playing while brushing back & forth according to an aspect of the invention.

Reference is now made to FIG. 1, which is a schematic representation of an oral care system 100 for brushing teeth effectively according to an aspect of the invention. The system 100 includes an electric toothbrush 102, a communication device 104 and a drone 106. The system 100 illustrates the horizontal movement back and forth of the electric toothbrush 102.

The electric toothbrush 102 comprises a motorized brush head 108 containing bristles and an elongated part 110 comprising a number of buttons 112 located on the body of the elongated part 110. The brush head 108 may be detachable from the elongated part 110 for cleaning and replacement purposes. The buttons 112 may be of different colors, size and shape for easy identification. The buttons 112 may be physical buttons operated to perform various functions of starting and stopping the brushing activity, controlling the brushing speed and modes, changing the brush head 108, controlling and operating the drone 106, communicating with the communication device 104, etc. Alternatively, the elongated part 110 may be provided with a touch panel comprising various touch buttons 112 for performing various functions as discussed above. Moreover, the buttons 112 may be a combination of physical buttons and touch buttons performing various functions. The electric toothbrush 102 may be waterproof to prevent damage to the buttons and other electric components while brushing and cleaning with water.

The electric toothbrush also comprises a network interface for connecting with the communication device 104 and the drone 106. The network interface may be capable of connecting through one or more of Internet, Bluetooth network, Wired LAN, Wireless LAN, WiFi Network, Zigbee Network, Z-Wave Network or Ethernet Network.

The communication device 104 may comprise one or more installed applications related to brushing activities, including displaying live brushing activity, performance, time of brushing, cleanliness scores, teeth and gum conditions, identification of plaque and other gum problems, past brushing records, etc. The applications may also include interactive games which motivate people, especially children, to brush regularly and effectively while playing these games. The children may be awarded reward points and offers in accordance with their brushing habits and cleanliness scores. In addition to the applications related to brushing activities, the communication device 104 may also comprise installed applications for playing games, watching sports, news, videos, listening music, reading articles and papers, and lot more.

The communication device 104 may be a personal computer, a laptop, a mobile phone, a tablet, a paging device and the like. The communication device 104 may comprise a network interface for connecting with the electric toothbrush 102 and the drone 106. The network interface may be capable of connecting through one or more of Internet, Bluetooth network, Wired LAN, Wireless LAN, WiFi Network, Zigbee Network, Z-Wave Network or Ethernet Network.

The drone 106 may be an Unmanned Aerial Vehicle (UAV) capable of connecting with the electric toothbrush 102 and the communication device 104 via a network. In various embodiments, the drone may include wings 114 having propellers/lift modules 530 (shown in FIG. 5) coupled to each wing tips with servo motors (not shown) that enable the propellers/lift modules 530 to be independently rotated with respect to the wing surface. The propellers/lift modules 530 may enable the drone 106 to operate in a wing flight mode, a hover mode, a vertical takeoff and a landing (VTOL) flight mode. In some embodiments, the drone 106 may further include a processor (not shown) located in the wings 114 for executing various commands and performing functions. The drone 106 may include one or more batteries (e.g., rechargeable batteries) (not shown) that may provide power to various components, including the processor and the wings 114. A radio module (not shown) may be configured to receive signals via connected antennas (not shown), such as command signals to perform various flight maneuvers, receive signals from the electric toothbrush 102 and the communication device 104 and provide such signals to the processor to assist in operation of the drone 106. The drone propellers 530 have a protective cage 532 to prevent accidents to fingers and hands of the nearby people, especially children.

Figure 5:
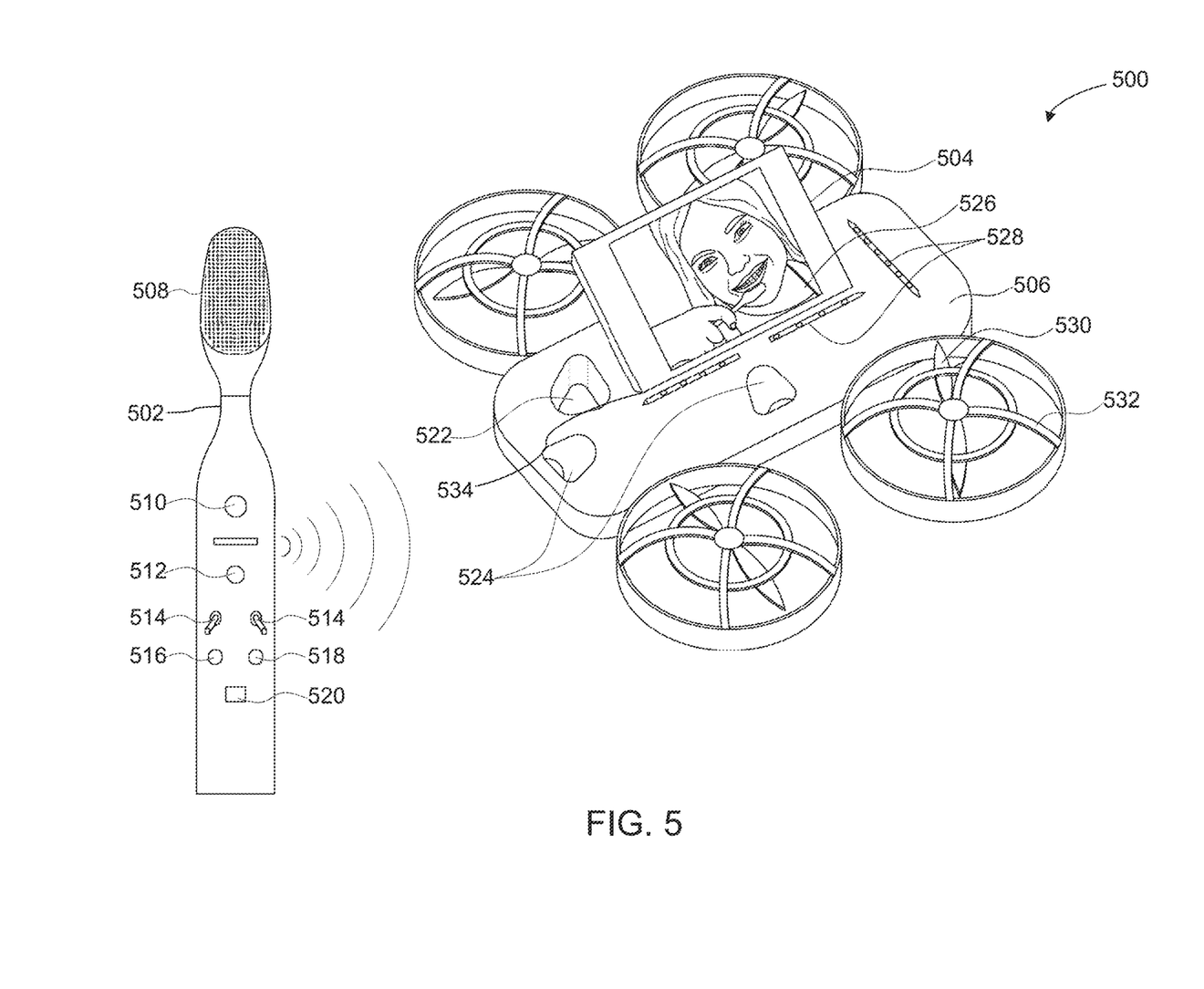
FIG. 5 illustrates schematic representation of the oral care system 500 during brushing action and hovering drone according to an aspect of the invention.

The drone 106 may include pedestals or platforms for placing the electric toothbrush 102 and the communication device 104. FIG. 5 illustrates a cavity 522 in the drone 506 for placing the electric toothbrush 502. The cavity also serves as a charging point for the electric brush 502 whose batteries are charged through the power provided by the drone 506 batteries. The drone 506 also comprise a platform or interface 534 for placing the communication device 504, such as a mobile phone. The interface 534 may also serve as the charging point for the communication device 504.

The drone 506 may also contain lights 528 for providing a pleasing visual effect to the person while brushing. The lights 528 may be LED lights of varying colors and having blinking effect providing a pleasing visual appearance while the drone 506 is in any operation mode. The lights 528 may adopt different appearance when the drone 506 is switched ON, when lifted from the surface, while moving along with the toothbrush 502 and while descending to the surface. The drone 506 may also have a sound system (not shown) which automatically produces various tones while the drone 506 is operated in different modes. The drone 506 may also comprise cameras 524 for capturing images of the person performing brushing activity and the surrounding areas. The cameras 524 may be capable of capturing still images and/or video images. The captured images may be transmitted through a network to the communication device 504 for display on a displaying screen 526. The drone 506 may also include a space 536 for placing a miniature bottle of water or any other liquid, for example, liquid mouthwash, a tumbler, and a small collapsible cup. Further, drone 506 may include a space 538 for placing a toothpaste tube. Alternatively, the space 538 may be used to squeeze a small amount of toothpaste which can be applied to the bristles of a toothbrush while brushing.

Figure 3A:
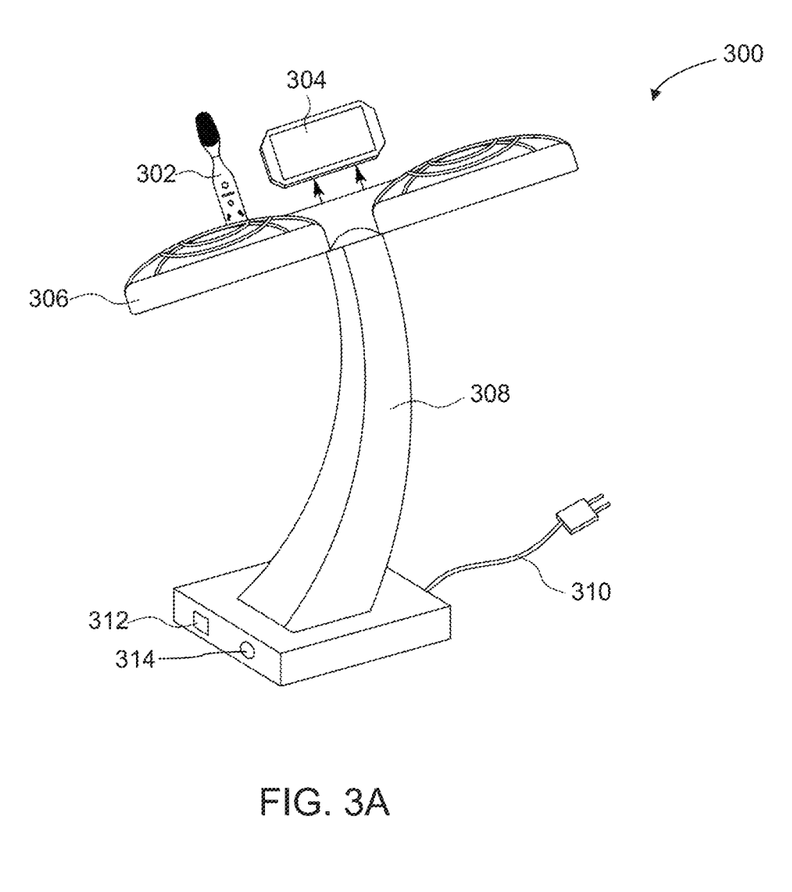
FIG. 3A illustrates schematic representation of the oral care system 300 with a drone connected to a charging stand.
Figure 3B:
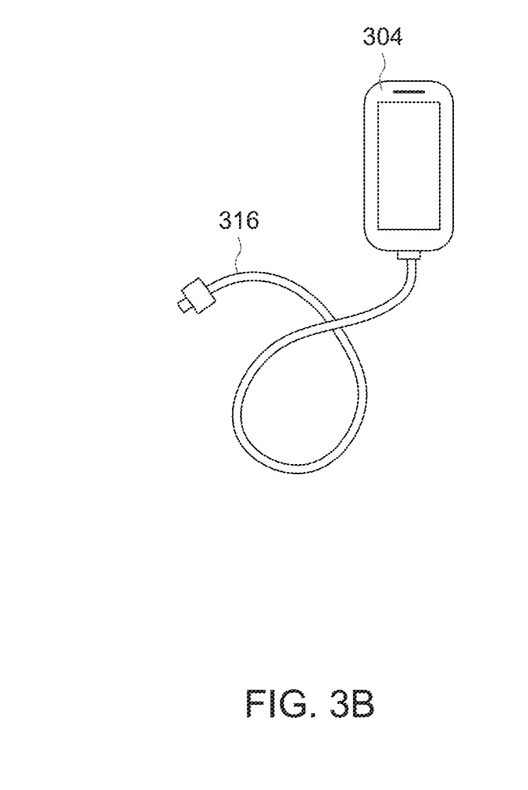
FIG. 3B illustrates a mobile phone with a USB charging connector that is capable of connecting to the electric toothbrush according to an aspect of the invention.

The drone 106 may also include a charging interface for connecting with a charging stand 308 for charging the batteries of the drone 306 as illustrated in FIG. 3A. The charging stand 308 may comprise a switch 312 an electric plug 310 to connect with a power source and charge the batteries of the drone. The power source may be a Direct Current DC power source, an Alternating Current AC power source, a Solar power source, a hydroelectric power source or a fuel power source. The charging stand may also comprise a USB port 314 for connecting with other devices. In case the drone batteries get lower than a particular threshold, the drone 306 automatically returns back to the charging stand 308 to recharge the batteries.

Figure 4:
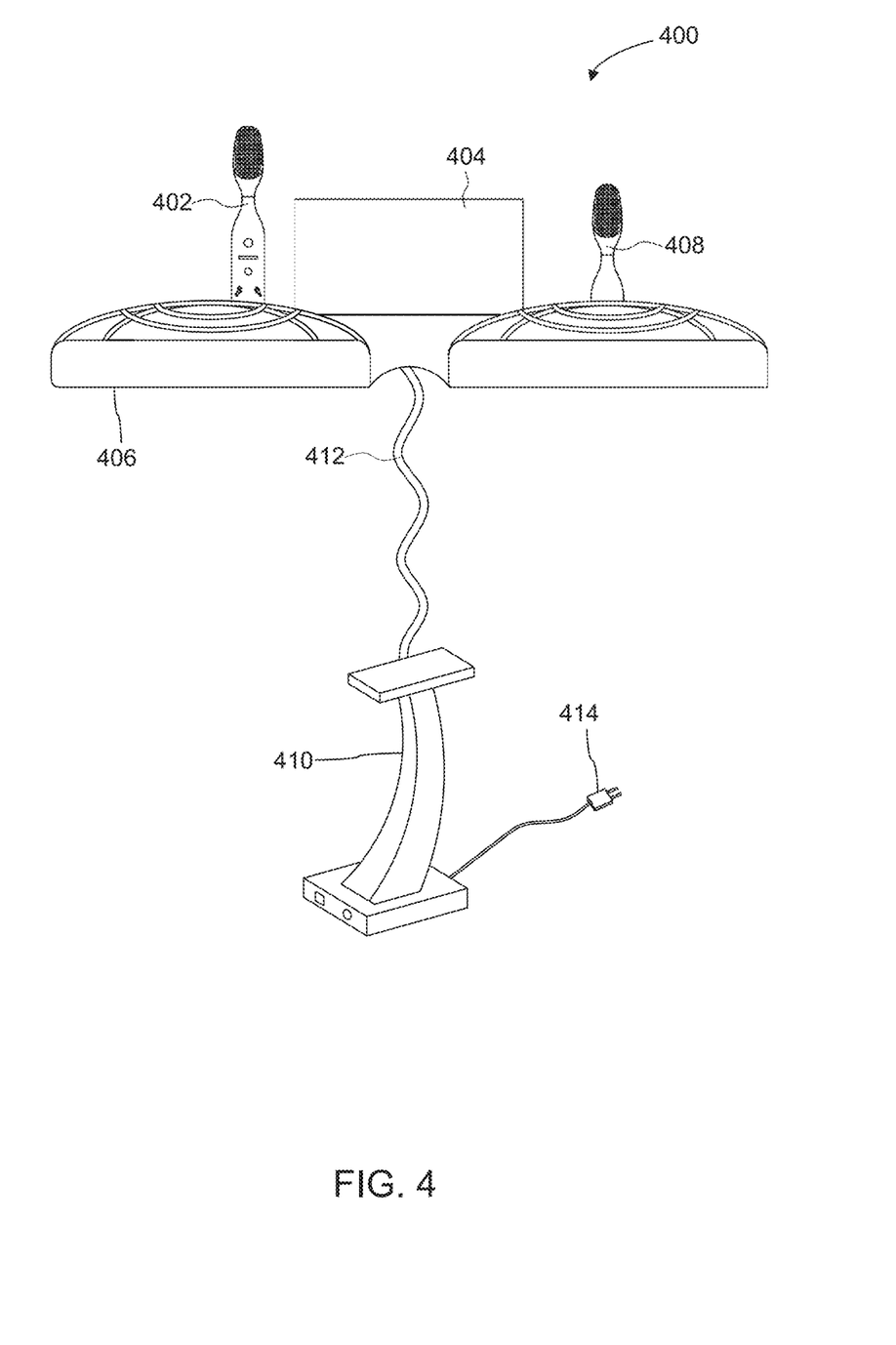
FIG. 4 illustrates schematic representation 400 of the drone connected to a retractable electric tether.

As illustrated in FIG. 4, the drone 406 may also comprise an interface for connecting with a Retractable Electric Tether 410 through a cable or connecting wire 412. The retractable electric tether 410 and cables 412 limit the movement of the drone 406 within a specific region. The retractable electrical cables 412 are especially useful for beginners and learners of the oral system so the drone 406 will always go up to a certain point of the brushing region. The electric cable 412 can be retracted by a button located on the pedestal of the drone 406 which detaches from the drone 406 and recoils back into the pedestal. Alternatively, the cable 412 can remain attached to the drone 406 allowing for more time to brush teeth without draining the drone batteries. A person, while brushing with the toothbrush 402, can detach the electric tether 410 and bring the drone to them. For example, in case the person having the toothbrush 402 in hand and he/she is not necessarily located in the bathroom, perhaps he/she is in the living room or bedroom, and the drone 406 is sitting on its pedestal in the bathroom, the person can press a button on the toothbrush 402 and automatically detach its tether 410 and summon or bring the drone to him. Also, in case the drone batteries get lower than a particular threshold, the drone 406 may be connected to the tether 410 through the cable 412 and the drone batteries are recharged through the tether 410 by connecting the electric plug 414 to a power source. This can enable the person to continue brushing while the drone gets charged.

Figure 7A:
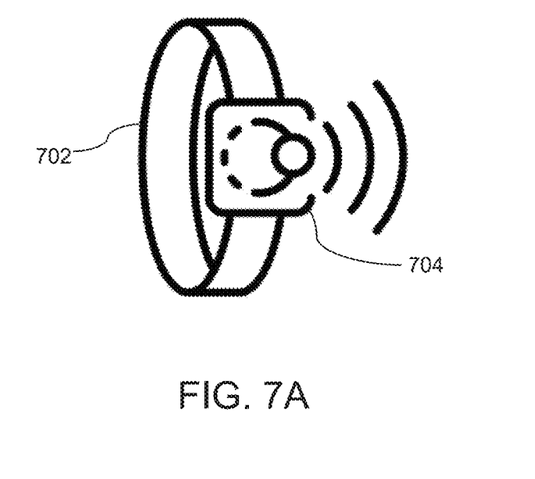
FIG. 7A illustrates an electronic wristband.
Figure 7B:
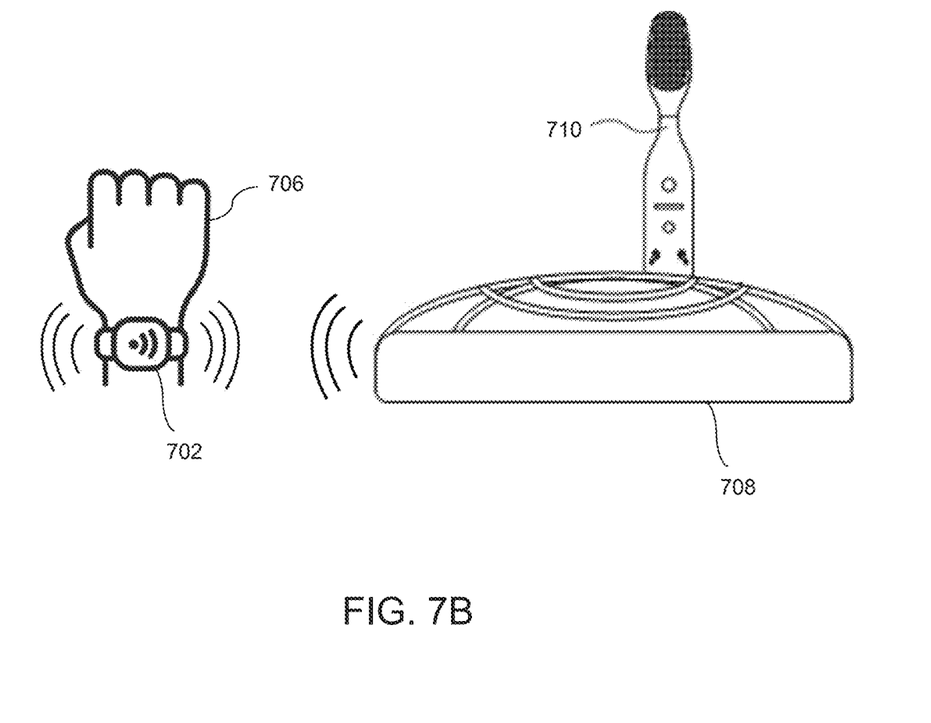
FIG. 7B illustrates the communication between the electronic wristband and the Drone.

In an alternative embodiment, the drone may be operated using an electronic wristband as shown in FIGS. 7A and 7B. The electronic wristband 702 may comprise a transceiver 704 which transmits and receives Bluetooth signals with the drone 708. The electronic wristband 702 may be worn on a hand 706 of the person. The person while brushing with the toothbrush, may summon the drone 708 by operating through the wristband 702 and bring the drone 708 to them. For example, in case the person having the toothbrush 710 in hand and he/she is not necessarily located in the bathroom, perhaps he/she is in the living room or bedroom, and the drone 708 is sitting on its pedestal in the bathroom, the person can press a button on the wristband 702 to bring the drone to him. Alternative to the Bluetooth network, wristband 702 may be connected to the drone 708 through Internet, Bluetooth network, Wired LAN, Wireless LAN, WiFi Network, Zigbee Network, Z-Wave Network or Ethernet Network.

Referring to the electric toothbrush 502 illustrated in FIG. 5, the toothbrush 502 includes a motorized brush head 508 containing bristles. The toothbrush 502 includes a camera 510 for capturing images of the mouth area including teeth, gums, tongue, etc. The camera 510 may capture still images and/or video images of different parts of the mouth while the person is brushing their teeth. The camera 510 may also be used to capture the image of the person performing brushing activity. For example, a child brushing tooth may click a selfie of his/her beautiful smile while brushing. The clicked image may be sent through a network interface of the toothbrush 502 to the parent's mobile device. In return, the parents may respond with thumbs up and/or verbal or text message to encourage their child for good oral habits. Further, the parents may also call and talk to the child on the communication device 504 while in brushing/playing mode. In addition, the captured images may be transmitted through a network to the communication device 504 for display on a displaying screen 526. The toothbrush 502 also comprises a button 512 for switching ON and OFF the toothbrush 502. The levers or buttons 514 may be used to operate the drone 506 and change its direction. For example, the levers 514 may be operated to move the drone UP, DOWN, LEFT and RIGHT. The button 516 may be used to switch ON and OFF the drone according to the brushing activity. The button 518 may be used to switch ON and OFF the drone's camera 524. The button 520 may be operated to keep the drone 506 in "Hover mode". During the hover mode, the drone remains at a fixed position in the air allowing brushing and/or playing process performed by the person.

Figure 2:
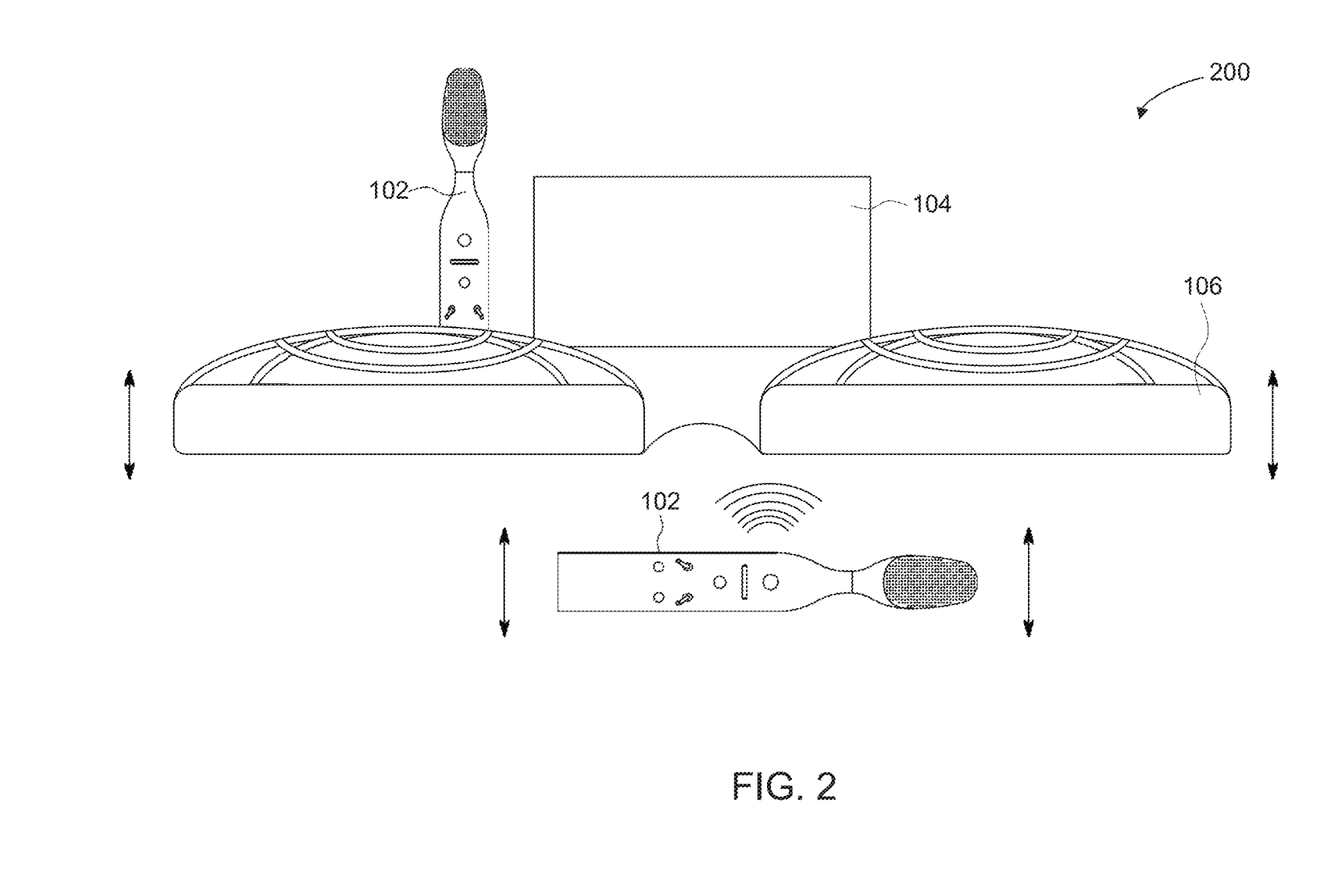
FIG. 2 illustrates a schematic representation of an oral care system 200 for brushing and playing while brushing up & down.
Figure 6:
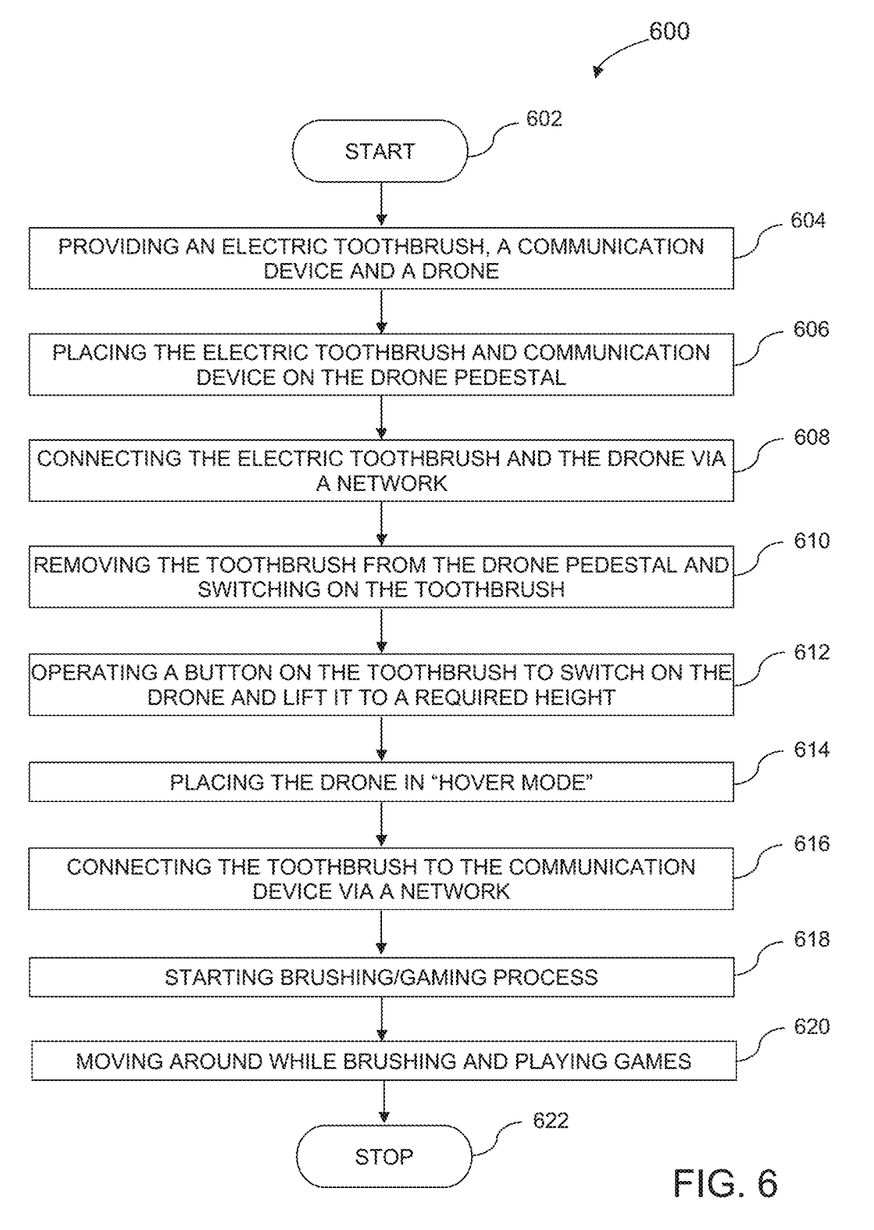
FIG. 6 illustrates a flow diagram 600 representing the operation of the oral care system according to an aspect of the invention.

Referring now to FIG. 6 which illustrates a flow diagram 600 for the operation of the oral care system. The process starts at step 602 by providing the electric toothbrush 502, the communication device 504 and the drone 506 at step 604. The toothbrush 502 and the communication device 504 are placed respectively on the pedestal or platforms 522 and 534 provided on the drone 506 at step 606. At step 608, the electric toothbrush is wirelessly connected to the drone 506 via a communication network. At step 610, the toothbrush 502 is removed from the drone pedestal 522 and the toothbrush 502 is switched ON through the button 512. At step 612, the drone 506 may be switched ON automatically when the toothbrush 502 is removed from the pedestal 522. Alternatively, the drone 506 may be switched ON by operating the toothbrush button 516 manually. Additionally, the drone cameras 524 may also be switched ON through the button 518. The drone 506 may be lifted to a required height and moved to a desired position by operating the levers 514. Since the toothbrush 502 and the drone 506 are connected via a communication network, the drone 506 may move along with the toothbrush 502. For example, if the person performing brushing process with the toothbrush 502 walks around his/her home, the drone 506 follows its path. FIGS. 1 and 2 illustrate the movement of the drone 106 carrying the laptop device 104 in accordance with the brushing activity. In FIG. 1, when the brush 102 moves back and forth, the drone 106 follows accordingly. Similarly, in FIG. 2, when the brush 102 moves up and down, the drone 106 follows accordingly.

Referring back to FIG. 6, at step 614, the drone 506 is placed in "hover mode" in which the drone 506 is placed at a fixed areal position. The person performing brushing process may place the drone at a certain height according to his/her height or standing position. The drone may be placed in the hover mode by lifting it to a desired height and pressing the button 520 on the toothbrush 502.

At step 616, the electric toothbrush 502 is connected to the communication device 504 via the communication network. At step 618, the person starts with the brushing and/or gaming activities. The person may use the communication device 504 for brushing related or non-related activities along with brushing through the electric toothbrush 502. At step 620, the person may move around while brushing and playing games on the mobile phone 504 carried by the drone 506. This functionality may be enabled by switching OFF the hover mode by pressing the button 520 again. The process stops at step 622 with the drone 506 returning to its pedestal and the toothbrush 502 is in place after completion of the brushing activity.

Figure 8:
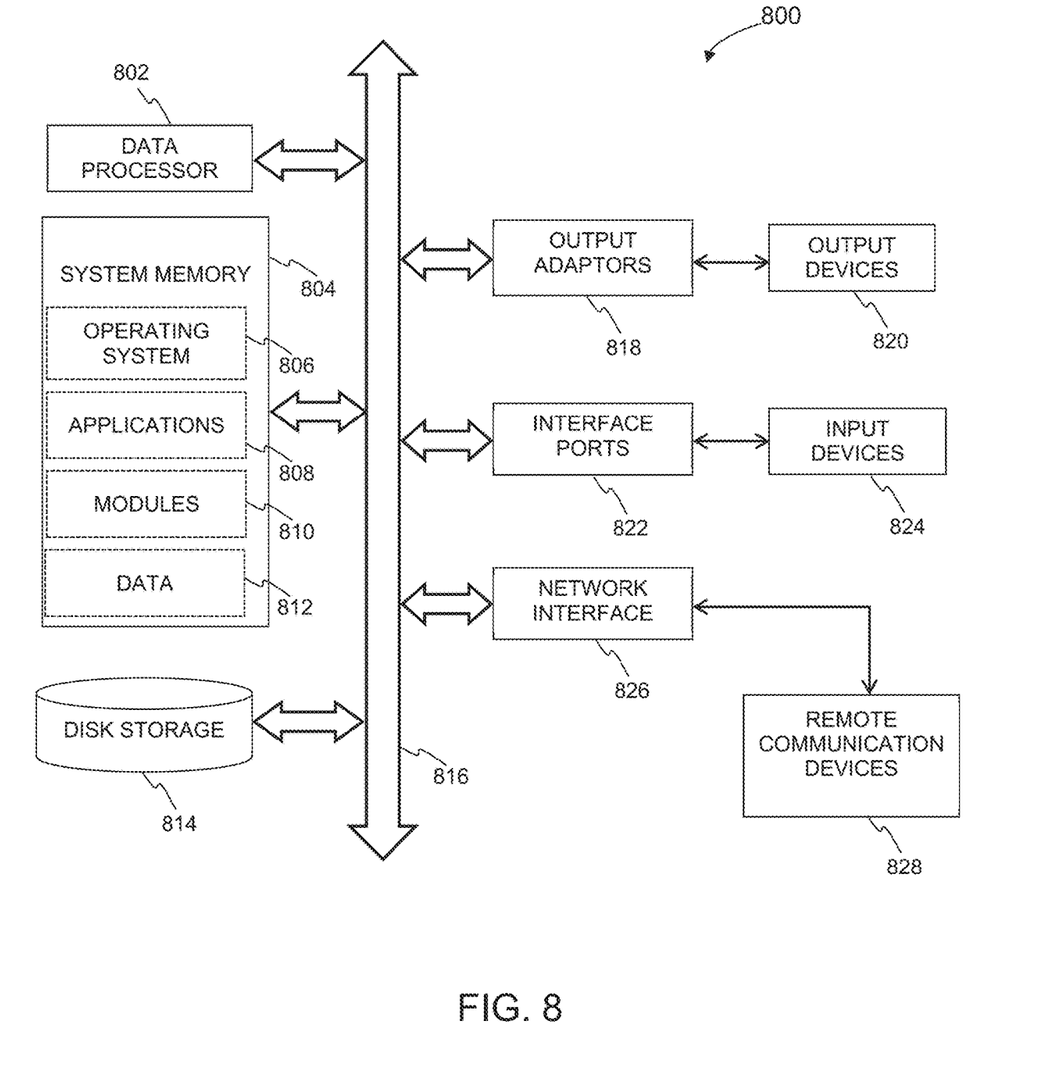
FIG. 8 illustrates an exemplary system 800 for implementing various aspects of the invention.

FIG. 8 illustrates an exemplary system 800 for implementing various aspects of the invention. The system 800 includes a data processor 802, a system memory 804, and a system bus 816. The system bus 816 couple system components including, but not limited to, the system memory 804 to the data processor 802. The data processor 802 can be any of various available processors. The data processor 802 refers to any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). Furthermore, various functional aspects of the data processor 802 may be implemented solely as software or firmware associated with the processor. Dual microprocessors and other multiprocessor architectures also can be employed as the data processor 802.

The system bus 816 can be any of several types of bus structure(s) including the memory bus or memory controller, a peripheral bus or external bus, and/or a local bus using any variety of available bus architectures known to those of ordinary skill in the art.

The system memory 804 may include computer-readable storage media comprising volatile memory and nonvolatile memory. The non-volatile memory stores the basic input/output system (BIOS), containing the basic routines to transfer information between elements within the system 800. The nonvolatile memory can include, but not limited to, read only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The system memory 804 includes an operating system 806 which performs the functionality of managing the system 800 resources, establishing user interfaces, and executing and providing services for applications software. The system applications 808, modules 810 and data 812 provide various functionalities to the system 800.

The system 800 also includes a disk storage 814. Disk storage 814 includes, but is not limited to, devices like a magnetic disk drive, floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

A user enters commands or information into the system 800 through input device(s) 824. Input devices 824 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 824 connect to the data processor 802 through the system bus 816 via interface port(s) 822. Interface port(s) 822 include, for example, a serial port, a parallel port, a game port, and a universal serial bus (USB).

The output devices 820 like monitors, speakers, and printers are used to provide output of the data processor 802 to the user. Another example, a USB port may be used as an input device 824 to provide input to the system 800 and to output information from system 800 to the output device 820. The output devices 820 connect to the data processor 802 through the system bus 816 via output adaptors 818. The output adapters 832 may include, for example, video and sound cards that provide a means of connection between the output device 820 and the system bus 816.

The system 800 can communicate with remote communication devices 828 for exchanging information. The remote communication device 828 can be a personal computer, a server, a router, a network PC, a workstation, a microprocessor-based appliance, a mobile phone, a laptop, a tablet, a paging device, a peer device or other common network node and the like.

Network interface 826 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

The systems and methods explained above may enable effective brushing and simultaneously performing activities on the communication device without limiting the person's movement.

While the preferred embodiment of the present invention and its advantages has been disclosed in the above detailed description, the invention is not limited there to but only by the scope of the appended claim.

As will be readily apparent to those skilled in the art, the present invention may easily be produced in other specific forms without departing from its essential characteristics. The present embodiments are, therefore, to be considered as merely illustrative and not restrictive, the scope of the invention being indicated by the claims rather than the foregoing description, and all changes which come within therefore intended to be embraced therein.

I claim:

1. A system for maintaining oral hygiene comprising:
   an electric toothbrush, the electric toothbrush comprising:
   a motorized brush head containing bristles;
   an elongated member having a proximal end configured to couple to the brush head and a distal end configured to engage with a platform, wherein the elongated member comprises a plurality of buttons;
   a camera configured to capture image of a person performing brushing activity, wherein the camera is configured to switch between an enabled state and a disabled state; and
   a network interface configured to enable communication between the electric toothbrush and one or more communication devices; and
   an Aerial Vehicle (AV) Drone, the AV Drone comprising:
   propellers or lift modules which enables the Drone to operate in different operating modes;
   rechargeable batteries to provide power to one or more components of the Drone;
   the platform comprising a plurality of cavities for placing the electric toothbrush and the one or more communication devices; and
   a radio module configured to communicate with the electric toothbrush and the one or more communication devices which are configured to operate the Drone;
   wherein the Drone is configured to move, either automatically or operable through the electric toothbrush buttons, along with the person performing the brushing activity using the electric toothbrush, and
   wherein the Drone carrying the one or more communication devices enables the person to perform the brushing activity using the electric toothbrush and use installed applications on the one or more communication devices.

2. The system of claim 1, wherein the AV Drone further comprises one or more lights of varying colors and blinking effect to provide a pleasing visual appearance while the Drone is in any of the operating modes.

3. The system of claim 1, wherein the AV Drone further comprises a sound system which automatically produces various tones while the Drone is in any of the operating modes.

4. The system of claim 1, wherein the AV Drone further comprises an image capturing device for capturing images of the person performing the brushing activity and surrounding areas.

5. The system of claim 4, wherein the images captured by the AV Drone camera are configured to be transmitted to the communication device for displaying on a display screen.

6. The system of claim 1, wherein the AV Drone further comprises cavities for placing one or more of a bottle, a cup, a tumbler and a toothpaste tube.

7. The system of claim 1, wherein the AV Drone further comprises a charging interface configured to connect with a charging stand for charging the batteries of the Drone.

8. The system of claim 7, wherein the AV Drone is configured to automatically return back to the charging stand to recharge the batteries when the batteries power decreases below a pre-set threshold.

9. The system of claim 1, wherein the AV Drone further comprises an interface for connecting with a Retractable Electric Tether through a connecting cable, wherein the retractable electric tether and the cable limit the movement of the Drone within a specific region and increases its usage time.

10. The system of claim 9, wherein the AV Drone is configured to be detached from the Retractable Electric Tether by pressing a button on the electric toothbrush.

11. The system of claim 9, wherein the Retractable Electric Tether is also configured to recharge the batteries of the AV Drone.

12. The system of claim 1, wherein the operating modes of the AV Drone are is configured to operate in one or more of a wing flight mode, a hover mode, a vertical take-off and a landing (VTOL) flight mode.

13. The system of claim 1, wherein the AV Drone further comprises a memory and a processor configured to execute instructions stored in the memory for operating the Drone in the different operating modes.

14. The system of claim 1, wherein the buttons are configured to be physical buttons, touch buttons, or a combination thereof.

15. The system of claim 1, wherein the buttons perform one or more functions including, starting or stopping of the brushing activity, controlling a brushing speed and a operating modes, changing the brush head, operating the toothbrush camera, controlling and operating the AV Drone and communicating with the communication devices.

16. The system of claim 1, wherein the communication devices are configured to include one or more of a personal computer, a laptop, a mobile phone, a tablet and a paging device.

17. The system of claim 1, wherein the communication devices are configured to comprise installed applications related to or not related to the brushing activities.

18. The system of claim 1, wherein the AV Drone is configured to be lifted to a desired height and placed in a hover mode to perform the brushing activity and use the installed applications on the communication device.

19. The system of claim 1, wherein the AV Drone is further configured to connect with an electronic wristband to be worn by the person performing the brushing activity, the electronic wristband is operable to summon the Drone and bring it closer to the person performing the brushing activity.

20. The system of claim 1, wherein the AV Drone is further configured to automatically move in accordance with the electric toothbrush while the brushing activity is being performed.

21. A method for maintaining oral hygiene comprising:
providing an electric toothbrush, the electric toothbrush comprising:
  a motorized brush head containing bristles;
  an elongated member having a proximal end configured to couple to the brush head and a distal end configured to engage with a platform, wherein the elongated member comprises a plurality of buttons;
  a camera configured to capture image of a person performing brushing activity, wherein the camera is configured to switch between an enabled state and a disabled state;
  a network interface configured to enable communication between the electric toothbrush and one or more communication devices;
providing an Aerial Vehicle (AV) Drone, the AV Drone comprising:
  propellers or lift modules which enables the Drone to operate in different operating modes;
  rechargeable batteries to provide power to one or more components of the Drone;
  the platform comprising a plurality of cavities for placing the electric toothbrush and the one or more communication devices;
    a radio module configured to communicate with the electric toothbrush and the one or more communication devices which are configured to operate the Drone;
placing the one or more communication device on the cavities of the AV Drone;
establishing a connection between the network interface of the electric toothbrush and the radio module of the AV Drone;
operating the electric toothbrush buttons to lift the AV Drone to a required height and move it to a desired position; and
performing the brushing activity using the electric toothbrush along with using installed applications on the one or more communication devices,
wherein the AV Drone is configured to move, either automatically or operable through the electric toothbrush buttons, along with the person performing the brushing activity using the electric toothbrush.

22. The method of claim 21 further comprises providing an image capturing device in the AV Drone for capturing images of the person performing the brushing activity and surrounding areas.

23. The method of claim 22 further comprises transmitting the captured images to the communication device for displaying on a display screen.

24. The method of claim 21 further comprises providing a plurality of cavities on the AV Drone for placing one or more of a bottle, a cup, a tumbler and a toothpaste tube.

25. The method of claim 21 further comprises providing a charging interface on the AV Drone configured to connect with a charging stand for charging the batteries of the Drone.

26. The method of claim 25, wherein the AV Drone is configured to automatically return back to the charging stand to recharge the batteries when the batteries power decreases below a pre-set threshold.

27. The method of claim 21 further comprises providing an interface on the AV Drone for connecting with a Retractable Electric Tether through a connecting cable, wherein the retractable electric tether and the cable limit the movement of the Drone within a specific region and increases its usage time.

28. The method of claim 21, wherein operating the electric toothbrush buttons further comprises operating the operating modes of the AV Drone in one or more of a wing flight mode, a hover mode, a vertical take-off and a landing (VTOL) flight mode.

29. The method of claim 21, wherein operating the electric toothbrush buttons comprises lifting the AV Drone to a desired height and placing it in a hover mode to perform the brushing activity and using the installed applications on the communication device.

30. The method of claim 21 further comprises establishing a connection between the radio module of the AV Drone and an electronic wristband worn by the person performing the brushing activity and operating the Drone through the electronic wristband to summon the Drone and bring it closer to the person performing the brushing activity.

* * * * *